Jan. 30, 1962 J. J. KEILMAN 3,019,056
SEGMENTAL DISK WHEEL
Filed July 29, 1959 2 Sheets-Sheet 1
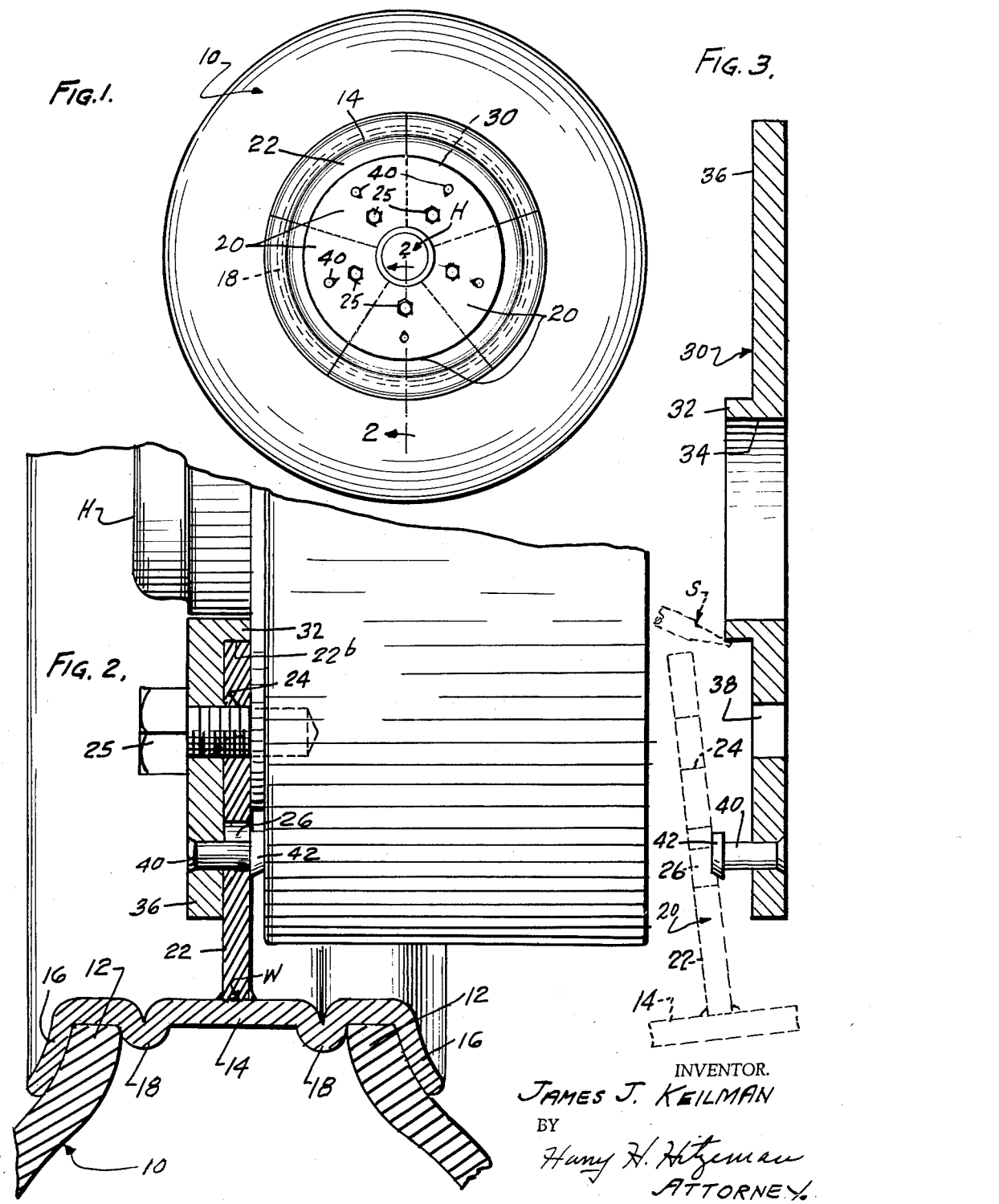
INVENTOR.
JAMES J. KEILMAN
BY
Harry H. Hitzeman
ATTORNEY.

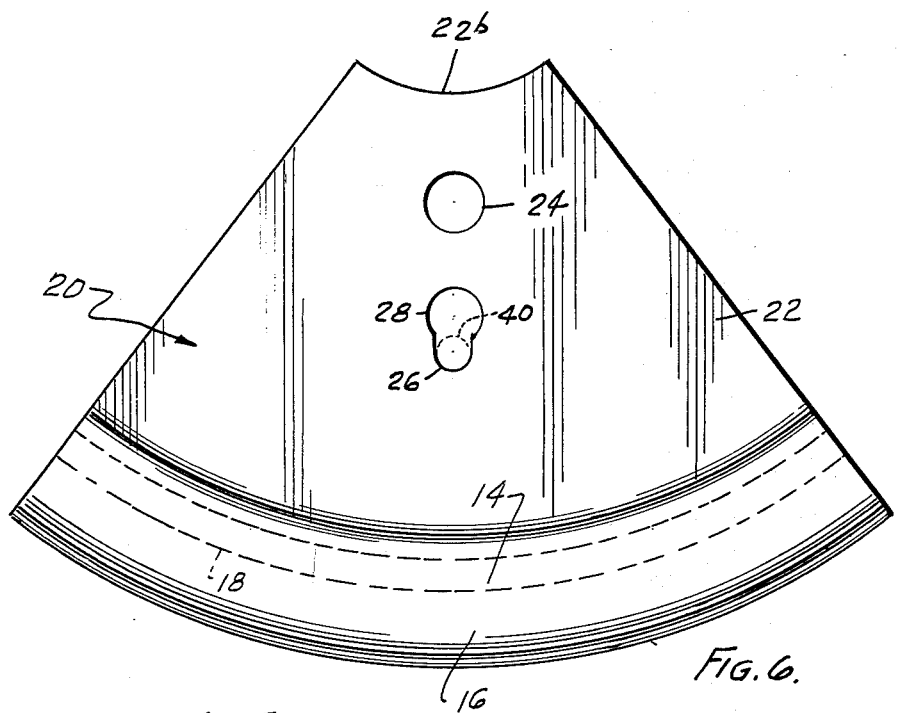
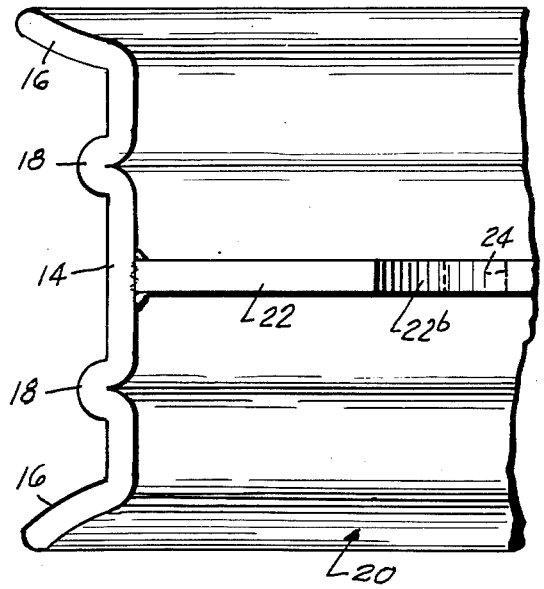
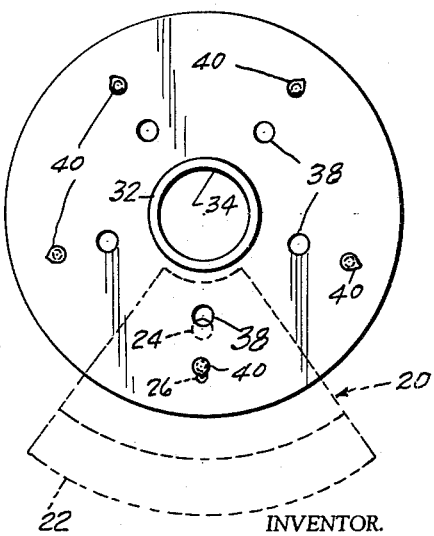

United States Patent Office

3,019,056
Patented Jan. 30, 1962

3,019,056
SEGMENTAL DISK WHEEL
James J. Keilman, Chicago, Ill., assignor to L. J. R. Corporation, Chicago, Ill., a corporation of Illinois
Filed July 29, 1959, Ser. No. 830,394
6 Claims. (Cl. 301—63)

My invention relates to improvements in disk wheel construction.

My invention relates more particularly to the construction of disk wheels of the type used on automotive vehicles equipped with pneumatic tires.

One of the most tedious of all chores in connection with using automobiles is the fixing of flat tires and changing of the same. The removal and replacement of the tires on the rim of the wheel is extremely difficult out on the road, and garages are now all provided with special equipment for removing a casing from the rim and for replacing it after the inner tube has been repaired. Sometimes in the use of this equipment the inner tube may be pinched between the rim and the casing, and this results in tearing and lacerating the tube. At best, and with present equipment furnished with all cars, the changing of tires is a difficult task.

The principal object of the present invention is to provide a disk wheel construction on which tires are easily mounted or removed.

A further object of the invention is to provide a disk wheel comprising a plurality of segments and a mounting collar for attachment to the hub.

A further object of the invention is to provide such a structure whereby with only a screwdriver or similar bladed instrument the wheel may be easily separated from the tire.

A further object of the invention is to provide a segmental wheel structure that has a tire mounting rim with provision thereon far spacing and holding the inner tire edges in proper alignment.

Another object of the invention is to provide a segmental disk wheel structure that is easily and simply manipulated and one which average drivers can operate to remove and change inner tubes or tires.

Other objects and advantages will be more apparent from the following description wherein reference is had to the accompanying drawings, upon which:

FIG. 1 is a front elevational view of a disk wheel and rim constructed in accordance with my invention;

FIG. 2 is a fragmentary cross-sectional view thereof taken on the line 2—2 of FIG. 1;

FIG. 3 is a cross-sectional view through the vehicle wheel mounting plate showing one of the sectors being applied thereto in dotted lines;

FIG. 4 is a side elevational view of one of the vehicle wheel sectors;

FIG. 5 is a fragmentary plan view thereof; and

FIG. 6 is a front elevational view of the sector mounting ring, one of the vehicle wheel sectors being shown in dotted lines in the act of being applied thereto.

In the embodiment of the invention which I have chosen to illustrate and describe the same, I have shown a pneumatic tire 10 of the usual type having the inner edge portions 12 held in proper position on the rim 14 fit between the curled edge portions 16 and a pair of circular ridges 18 which assist in positioning the edges of the tire properly for inflation of the inner tube.

The segmental wheel which forms the subject matter of this invention consists preferably of five segments 20, each of which has a rim portion 14 and a flat segmental disk portion 22 that extends inwardly medially from each rim portion and is preferably welded, as shown at W, to the rim portion, or the rim and wheel portions may be made in one piece if desired.

Each of the sector shaped wheel portions 22 has two openings therethrough, the usual opening 24 for receiving the mounting, or fastening, bolts 25 that extend outwardly from the hub portion H of the vehicle, and a second and aligned opening 26 which is elongated and has an enlargement 28 at one end of the same.

The sectors 20 are adapted to be fastened on a mounting ring 30 which has an inner collar 32 about an opening 34 through which the end of the hub portion may extend, and a circular body portion 36 that has five radial bolt openings 38 therein through which the mounting or fastening bolts 25 extend. Locating pins 40 are in alignment with the openings 26, the locating pins 40 having slightly enlarged heads 42 so that they may be received through the enlarged portions 28 of the elongated openings 26. The wheel sector is pushed outwardly and flattened against the mounting ring 30 with an arcuate edge 22b of each sector bearing against the collar 32 of the mounting ring 30.

Thus with the mounting ring having a mounting bolt 25 in alignment with the bolt openings 38, the wheel may be assembled by shoving the sectors 22 outwardly against the tire and locking them over the heads 42 of the locating pins 40 with the inner portion 22b of each sector fastened into position against the collar 32 and the rim portion 14 holding the inner edges of the tire, as shown.

In this way it is an easy matter for a person equipped with a screwdriver or similar tool to take off and put on a tire on this type of wheel. In disassembling the wheel, one sector is first removed by inserting the edge of a screwdriver S between the collar 32 and the inner edge 22b of a sector and moving the sector outwardly about ⅛ inch or so, so that the end of the elongated opening 26 may permit the head 42 of the locating pin 40 to pass therethrough. It is of course necessary to first take the wheel off the mounting bolts 25 that fasten the wheel to the hub.

From the above and foregoing description it can be seen that I have provided a construction of segmental wheel that is easily assembled by shoving the sectors outwardly from the mounting ring and snapping them over the heads 42 of the locating pins with the rim portion holding the inner edge of the tire as shown. Since the tires are made of rubber, it is an easy matter to move a segment of the wheel outwardly about ⅛ inch as is required for permitting the segment to be taken off. It is of course understood that the action on the segment holes takes place when the wheel is removed from the hub, so that the only thing that holds the segments and the mounting collar together is the locating pins 40. When the wheel is mounted, the pins 40 have their heads 42 positioned between the ring 30 and the brake housing, thus preventing movement between the segments and the mounting collar.

While I have illustrated and described a specific embodiment of the invention, it will be understood by those skilled in the art that changes and modifications may be made in the exact details shown, and I do not wish to be limited in any particular; rather what I desire to secure and protect by Letters Patent of the United States is:

1. A disk wheel for pneumatic tires comprising a circular mounting ring having a medial opening, a circular collar surrounding said opening, a circular row of mounting bolt openings surrounding said collar, a second circular row of shouldered pins concentric to and radially aligned with said mounting bolt openings and a plurality of disk segments, each segment having an inner circular edge complementary to said collar, an opening aligned with one of the mounting bolt openings and an elongated opening aligned wtih the shouldered pin, each of said sector shaped members having a tire engaging rim portion thereon and capable when a plurality are mounted on said mounting ring to form a circular tire engaging rim.

2. A disk wheel for pneumatic tires comprising a circular mounting ring having a medial opening, a circular collar surrounding said opening, a circular row of mounting bolt openings surrounding said collar, a second circular row of shouldered pins concentric to and radially aligned with said mounting bolt openings and a plurality of disk segments, each segment having an inner circular edge complementary to said collar, an opening aligned with one of the mounting bolt openings and an elongated opening aligned with the shouldered pin, each of said sector shaped members having a tire engaging rim portion thereon and capable when a plurality are mounted on said mounting ring to form a circular tire engaging rim, said mounting ring having five mounting bolt openings therein and five disk segments for mounting thereon, each segment having radial side walls forming a 72° angle.

3. A disk wheel for pneumatic tires comprising a circular mounting ring having a medial opening, a circular collar surrounding said opening, a circular row of mounting bolt openings surrounding said collar, a second circular row of shouldered pins concentric to and radially aligned with said mounting bolt openings and a plurality of disk segments, each segment having an inner circular edge complementary to said collar, an opening aligned with one of the mounting bolt openings and an elongated opening aligned with the shouldered pin, each of said sector shaped members having a tire engaging rim portion thereon and capable when a plurality are mounted on said mounting ring to form a circular tire engaging rim, said mounting ring having five mounting bolt openings therein and five disk segments for mounting thereon, each segment having radial side walls forming a 72° angle, said radial side walls and bolts through said mounting bolt openings fixedly holding said wheel in operative position on said collar.

4. A segmental disk wheel for pneumatic tires, comprising a circular mounting ring having a medial opening therein, a circular collar formed on said ring about said opening, a circular row of mounting bolt openings in said ring, a row of shouldered pins mounted on said ring concentric to and aligned with said bolt openings, and a plurality of sector shaped wheel portions each having aligned openings therethrough for a mounting bolt and a shouldered pin, the opening for said shouldered pin being elongated, said sector shaped members each having a tire rim portion on its periphery and an arc-shaped inner edge to fit around said collar.

5. A segmental disk wheel for pneumatic tires, comprising a circular mounting ring having a medial opening therein, a circular collar formed on said ring about said opening, a circular row of mounting bolt openings in said ring, a row of shouldered pins mounted on said ring concentric to and aligned with said bolt openings, and a plurality of sector shaped wheel portions each having aligned openings therethrough for a mounting bolt and a shouldered pin, the opening for said shouldered pin being elongated, said sector shaped members each having a tire rim portion on its periphery and an arc-shaped inner edge to fit around said collar, all of said elongated openings having an enlarged portion to pass over one of said shouldered pins and hold said sector shaped wheel portions locked against said mounting ring.

6. A segmental disk wheel for pneumatic tires, comprising a disk-shaped mounting ring, said mounting ring having a circular row of mounting bolt openings therethrough, a concentric row of shouldered pins radially aligned with said bolt openings on said mounting ring, a medial opening in said ring having a raised circular ring portion surrounding the same, a plurality of sector shaped wheel portions each having an opening therethrough for a mounting bolt and an elongated opening to receive a shouldered pin, said sector shaped members each having a flat peripheral rim portion thereon, said rim portion having two rows of raised shoulders thereon equally spaced from both side edges of said rim.

References Cited in the file of this patent

UNITED STATES PATENTS

| | | |
|---|---|---|
| 2,044,654 | Whited | June 16, 1936 |
| 2,193,131 | Hansen | Mar. 12, 1940 |
| 2,671,694 | Adams | Mar. 9, 1954 |
| 2,848,279 | Parker | Aug. 19, 1958 |